United States Patent [19]

Marnell, II

[11] Patent Number: 5,259,613
[45] Date of Patent: Nov. 9, 1993

[54] CASINO ENTERTAINMENT SYSTEM

[75] Inventor: Anthony A. Marnell, II, Las Vegas, Nev.

[73] Assignee: Rio Hotel Casino, Inc., Las Vegas, Nev.

[21] Appl. No.: 866,326

[22] Filed: Apr. 8, 1992

[51] Int. Cl.$^5$ ............................................. A63F 9/22
[52] U.S. Cl. ............................. 273/138 A; 273/460; 273/DIG. 28; 273/85 CP
[58] Field of Search ............ 273/138 R, 138 A, 143 R, 273/85 CP, 269, DIG. 28, 433, 434, 439, 85 G, 460

[56] References Cited

U.S. PATENT DOCUMENTS

| | | | |
|---|---|---|---|
| 4,531,187 | 7/1985 | Uhland | 273/85 CP |
| 4,614,342 | 9/1986 | Takashima | 273/138 A |
| 4,624,462 | 11/1986 | Itkis | 273/237 |
| 4,652,998 | 3/1987 | Koza et al. | 364/412 |
| 4,760,527 | 7/1988 | Sidley | 273/85 CP |
| 4,805,907 | 2/1989 | Hagiwara | 273/138 |
| 4,837,728 | 6/1989 | Barrie et al. | 364/412 |
| 4,838,552 | 6/1989 | Hagiwara | 273/138 |
| 4,982,346 | 1/1991 | Girouard et al. | 364/550 |
| 5,035,422 | 7/1991 | Berman | 273/439 |
| 5,083,271 | 1/1992 | Thacher et al. | 273/DIG. 28 |

FOREIGN PATENT DOCUMENTS 8101664 6/1981 PCT Int'l Appl. ............. 273/138 A
2192478 1/1988 United Kingdom ........... 273/138 A Primary Examiner—Jessica J. Harrison
Attorney, Agent, or Firm—Edward J. Quirk

[57] ABSTRACT

An entertainment system for slot players in a gaming establishment includes video monitors and speaker/microphones located adjacent each slot machine in a defined area of a gaming establishment. An operator at a centrally located control station can selectively provide video programming from a menu of live and recorded sources to any monitor or group of monitors. Similarly, live or recorded audio can be provided to any of the speakers, or the operator can converse from the control station with any of the players via the speaker/microphones located at each machine. The control station has a variety of audio and video sources, including at least one VCR, an audio tape deck, at least one live camera operable remotely from the control station by the operator, and commercial television broadcasting (e.g., CATV), as well as a live microphone Selection and transmission of signals from the various sources, as well as the destination slot locations, are accomplished by the use of separate computerized video and audio switching systems, each of which is conventional and commercially available. The communication system of the invention is entertaining for the players, and has resulted in players staying at machines considerably longer than at other machines not having this feature.

23 Claims, 6 Drawing Sheets

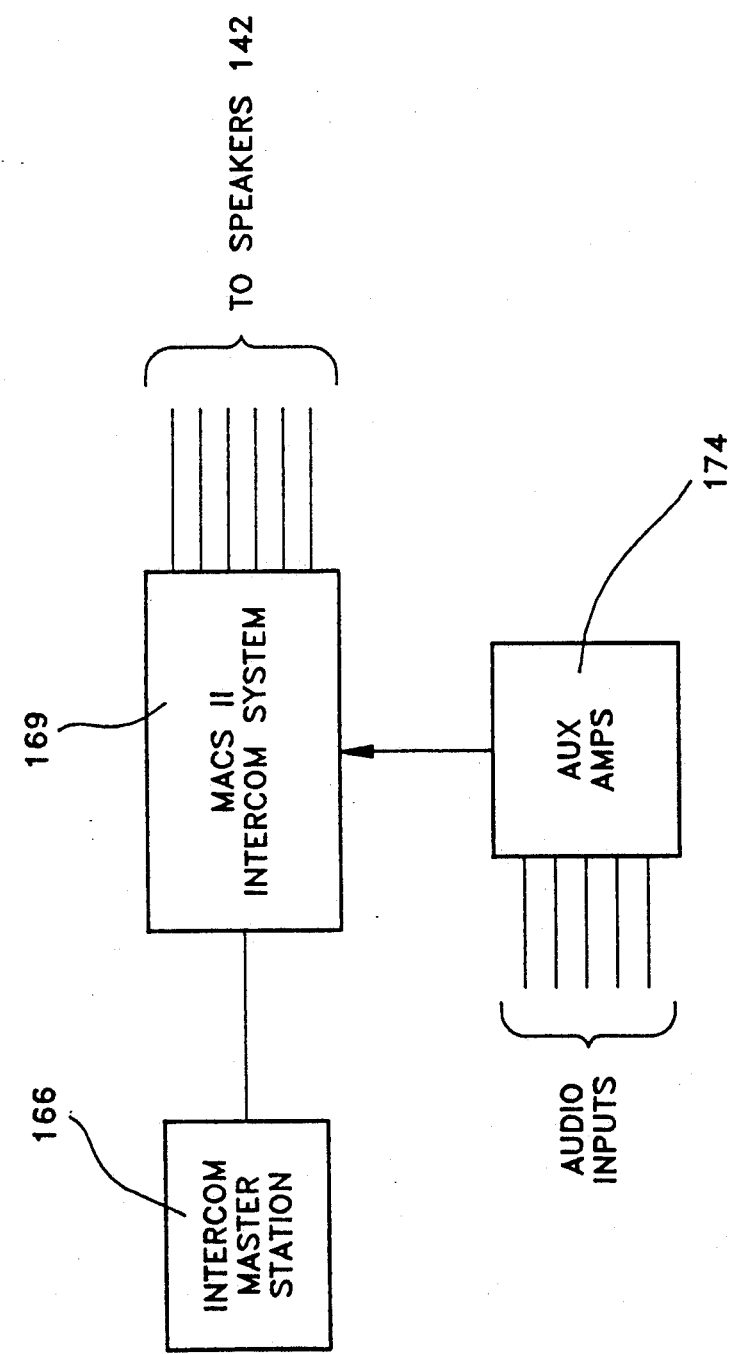

CASINO ENTERTAINMENT SYSTEM

This invention relates to an entertainment system for casinos, and more particularly to an entertainment system in which the players of a plurality of gaming machines can independently receive audio and video communications from a control station.

BACKGROUND OF THE INVENTION

Most legalized gaming establishments provide various types of gaming for their patrons. Traditionally, gaming establishments designate discrete areas in the casino for particular types of gaming. Live gaming, in the form of Twenty-One tables, Roulette tables, Craps tables and other games using live dealers are organized into "pits" in which a plurality of gaming tables are arranged around a central area. Race and sports books are provided in another separate area of the gaming establishment, often with large seating areas and live television transmission of the racing and sporting events that are the subject matter of the wagering. Another area of the gaming establishment is configured as a Keno lounge, with a counter at which the players turn in their selections and make their wagers and at which the winning numbers are drawn. Bingo rooms are also provided in which the participants can engage in live bingo play.

In the past, slot machine players were sometimes neglected by gaming establishments. Because each slot machine is capable of functioning as an independent device, slot machines were located in any space that the gaming establishment had available once the live table games, the bingo room, the keno lounge and the race and sports book were provided More recently, slot machines have been grouped into "slot banks" with each machine connected to a progressive meter. As play proceeds on the machines in a slot bank, the progressive meter increments and eventually a lucky player hits the winning combination and receives the amount shown on the progressive meter.

In the last fifteen to twenty years, slot machine revenues have increased much more rapidly than revenues from other types of gaming. The introduction of electronic slot machine equipment has improved the performance characteristics of slot machines and has allowed for the introduction of many different games that fall under the general umbrella of "slot machines." In addition to the well-known reel slot machines, many forms of video machines have been introduced. Video Twenty-One, video Bingo, video Keno, video Roulette and even video Lottery and video Punch Cards have also found a market in legalized gaming. In Nevada, slot machine play now accounts for more than 50% of the profit in many gaming establishments.

Because of the importance of slot machine play, each gaming establishment is constantly searching for marketing stratagems to appeal to slot machine players and to distinguish its slot machine business from the competitors. Because a casino's income from slot machines is statistically determined by the machines at a relatively small percentage of gross play, income is increased by enticing a player to continue to play for as long a time as is possible Many larger casinos offer slot machine "clubs" in which players are provided with plastic identity cards similar to a credit card or an ATM card. The plastic identity card is inserted into a card reader connected to each slot machine. Players earn points based on the number of coins that are inserted. The points are accrued on the identity card and are redeemable at the gaming establishment for gifts, meals or other prizes.

There is a need in the gaming business to provide attractions for slot machine players. Gaming establishments have long catered to live table game players by offering complimentary rooms and meals ("comps") in order to attract those players to a particular gaming establishment. Because live table games are conducted in discrete "pit" areas with dealers and supervisors present at all times, it is relatively easy for the gaming establishment to identify and "comp" players who engage in live table gaming. The close proximity of the live gaming tables also makes it quite easy for the gaming establishment to conduct live gaming tournaments as another type of attraction for players.

On the other hand, slot machine players generally wander throughout the gaming establishment playing different slot machines. The play of slot machines is not directly observed by dealers or supervisors thus making it more difficult to keep track of significant play by any one player. It is harder to determine which slot machine players should be provided with complimentary services In addition, the relatively small gross volume of play for each player often does not justify significant "comps" for many slot players Although slot machine tournaments have been attempted, it has been necessary to set aside a predetermined time period on a preselected bank of slot machines to conduct the slot machine tournament and these tournaments have a small impact on overall slot volume.

It is an object of the present invention to provide an entertainment system by which a gaming establishment can provide a unique attraction for slot machine players. It is another object of the invention to provide an entertainment attraction for slot players which will not only retain their interest in continuing to play the machine, but will also allow a player to select a specific type of video programming for his entertainment. Another object of the invention is to provide two-way audio communication between the control station operator and slot players, adding a personal touch to slot play which generally does not include conversation with a dealer or other casino employee.

It is a feature of the present invention to provide a plurality of gaming devices, each of which is equipped with audio and video communication equipment which is independently interconnected to a control station through which communication to players of the gaming devices can be established Each gaming device is provided with a television monitor and an audio speaker/microphone incorporated in or adjacent to the device. The control station can selectively engage in both voice and video communication with the players of each individual gaming device, any group of gaming devices or all of the gaming devices. Communication can be effected by live transmissions from a person in the control station, by prerecorded video or audio tape or by conventional over-the-air or cable television channels.

It is an advantage of the present invention that the gaming establishment can provide a designated slot machine play area which will attract players and keep them playing the slot machines for a longer period of time. The gaming establishment can determine more easily players who should be provided with "comps." Various promotions can be offered to the players through the video and audio communications. Live sporting events or even daytime soap opera television can be displayed to the player at his slot machine to encourage the player to remain at the slot machine while he is otherwise entertained. Overall, slot machine play is more enjoyable for the player and more profitable for the house.

Other objects, features and advantages of the present invention will become apparent from the following detailed description.

SUMMARY OF THE INVENTION

A plurality of gaming or slot machines of any desired type and mixture are located in a defined area ("slot machine parlor"). The players of each machine are in independent communication with a control station. Adjacent each slot machine is a video monitor and an audio speaker/microphone connected to the control station. By means of computerized switching equipment, various video and audio programming may be supplied to the players of machines in the parlor from the control station.

The control station has a master intercom station with audio communication means, including a microphone and speaker. The operator of the control station can converse with gaming device players either individually, or with a selected group of players of the gaming devices, or with all of the players in the slot parlor at once through audio microphones/speakers mounted in or adjacent to each of the gaming devices.

The control station is also equipped with various sources of video signals which can be sent selectively to one or more of the video monitors. The station may comprise any or all of one or more live video cameras, one or more video playback devices such as VCRs or video disk players, a source of commercial television signals (e.g., multi-channel CATV), and a personal computer which can be used to send special messages or graphics. By means of a computerized switching system which can be built from commercially available components, a control station operator may dispatch signals from any source available at the control station to any individual monitor or combination of monitors.

BRIEF DESCRIPTION OF THE DRAWINGS

The invention is best understood by reference to the drawings, in which:

FIG. 6 is a block circuit diagram of the audio switching system.

DETAILED DESCRIPTION OF THE PREFERRED EMBODIMENTS

Figure 1:
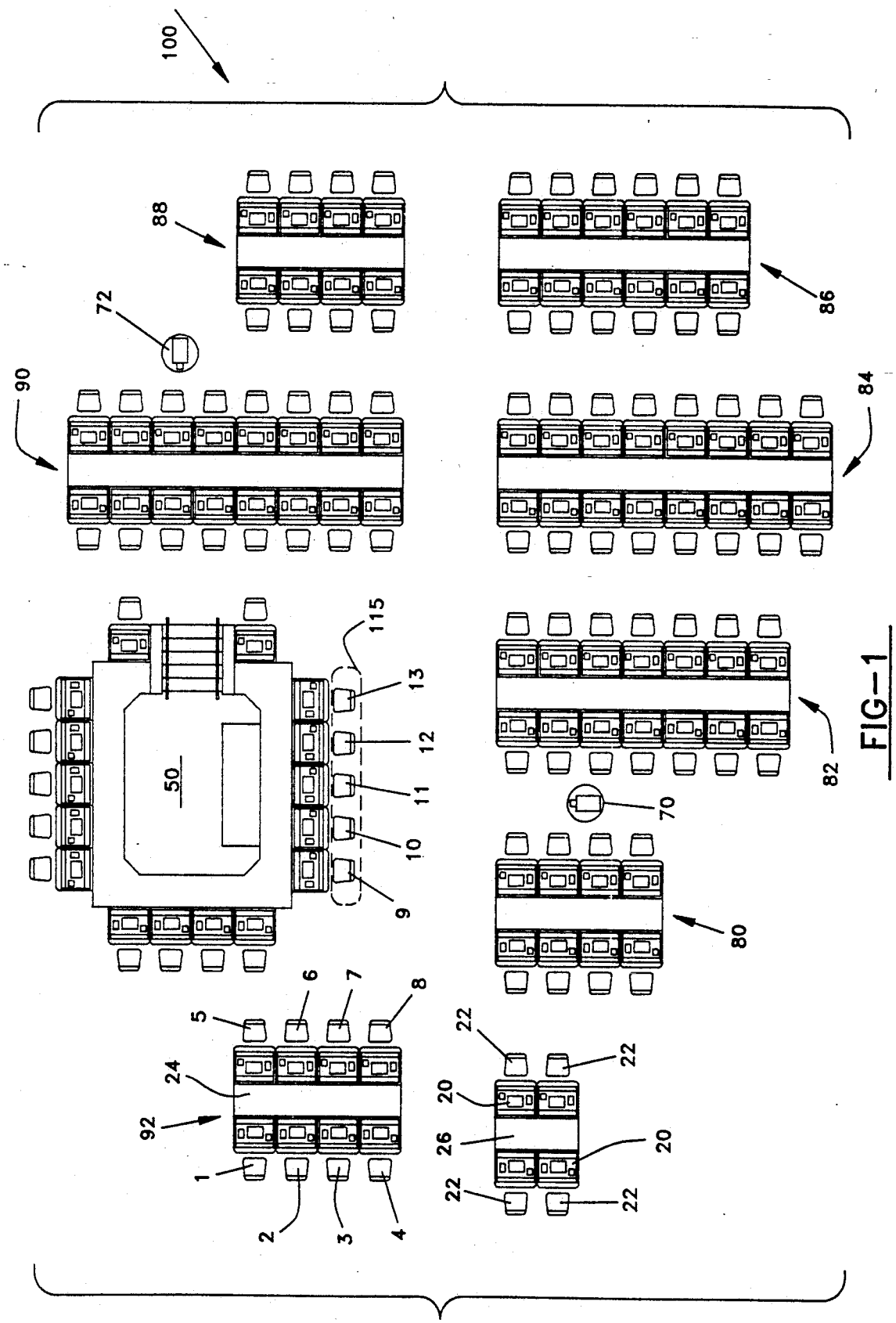
FIG. 1 shows a layout of the slot machine parlor of the present invention.

The plot plan of the slot machine parlor of the present invention is shown generally at 10 in FIG. 1. The slot machine parlor 100, which may be a well-defined area in a casino or may simply be a loosely defined grouping of machines in the same general area, includes a plurality of gaming or slot machines 20 which can be organized in any convenient manner. For example, as shown in FIG. 1, the slot machines 20 are organized into groups or banks of machines such as banks 80, 82, 84, 86, 88, 90, and 92. As arranged in the parlor, the opposing groups of slot machines in a bank are separated by a housing, such as housings 24 and 26, in which are mounted the video monitors and audio speaker/microphones later described herein. The housings are simply framing and panelling designed to aesthetically cover the components and do not form part of the invention.

Typically, each group of slot machines will be the same type of machine for the player's convenience to locate the type of slot machine that he wishes to play although the machines may be different if desired. As used herein, the term "slot machine" and "gaming machine" are used interchangeably to refer to any gaming machine which can be played individually by a player without the participation of a house "dealer". Typically, gaming machines 20 can be from the group consisting of video reel slot machines, video poker machines, video twenty-one machines, video bingo machines, video keno machines, video roulette machines, video lottery machines and video punch card machines Each machine 20 is preferably provided with a chair 22 at which the player sits during use of the machine.

The number of machines in any slot parlor accessed from a control station may vary. Generally, at least about ten machines, and preferably at least about thirty machines, are necessary to justify the effort and expense of installation and operation of the system. While the system depicted in FIG. 1 shows about 100 machines, this number could easily be increased to 200 or 300 or more. Larger numbers are operationally less desirable because, from a marketing standpoint, communications between a large number of players and an operator become less personal and more unwieldy as the number of slot locations served by a control station is increased. Preferred ratios are from about 50 to about 150 slot stations/central station. The audio and video switching systems of the invention are modular and can be easily increased to handle more slot machine locations.

The slot machine parlor 100 also includes a control station 50 located in a convenient portion of the slot machine parlor. While the control station is preferably located in the slot machine area and is visible to the players, it may be located away from the parlor in any other location. In the preferred embodiment, the control station 50 is disposed on a raised platform allowing each player seated at a slot machine 20 with potential line-of-sight access to the control station 50. As will be explained in detail, the control station 50 is in electronic communication with players of each of the slot machines 20.

Figure 2:
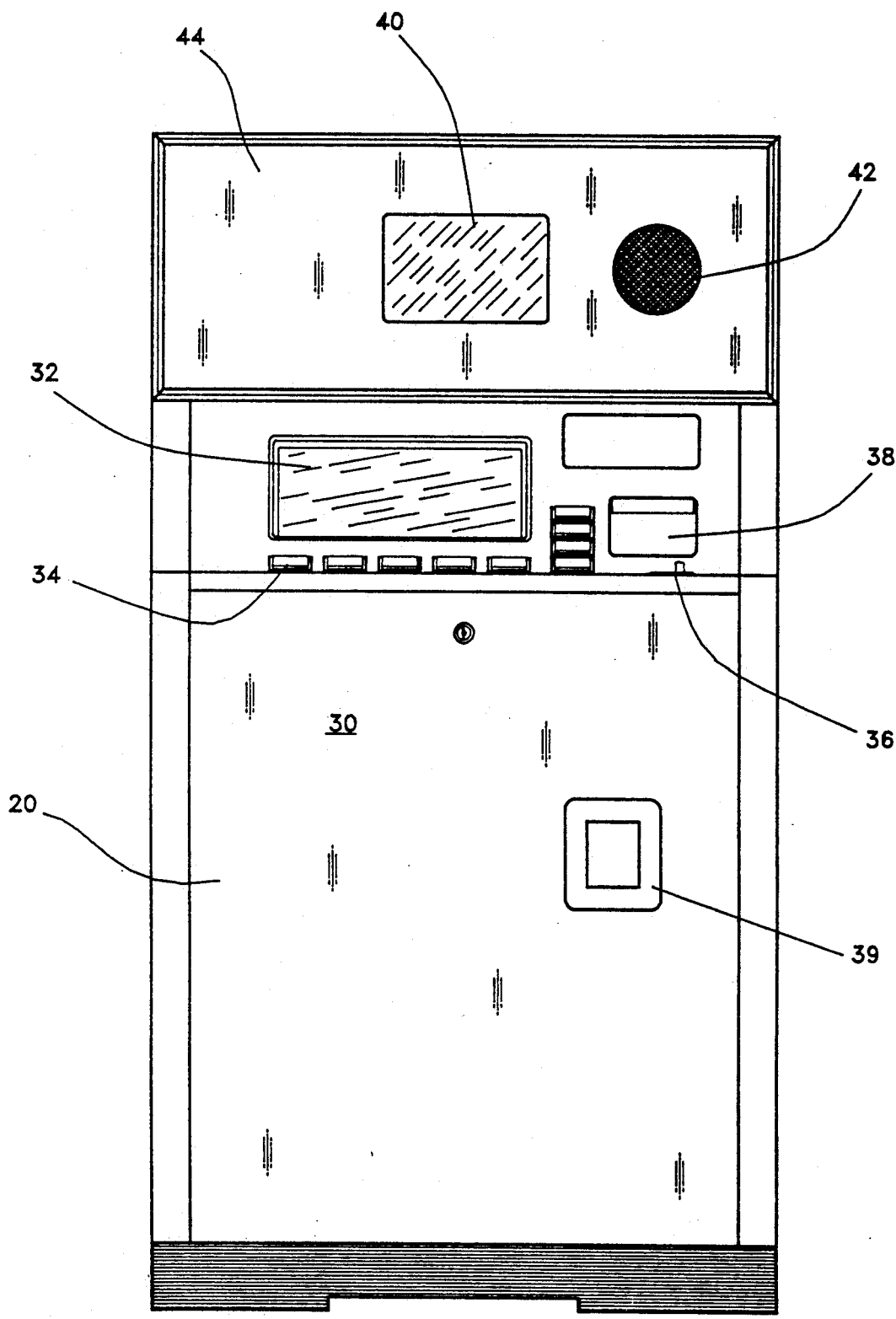
FIG. 2 shows a gaming device in a slot machine parlor having a television monitor and an audio speaker/microphone mounted adjacent thereto.

FIG. 2 shows a typical slot machine 20 that is used in conjunction with the present invention. In the preferred embodiment, the slot machine 20 is a slant top machine, although any design style of slot machine 20 can be used. The slot machine 20 has a machine body 30 that houses the internal operating parts such as the electronic operating system and the coin hopper and drop bucket. The slot machine 20 includes a game display screen 32 and play buttons 34 for the player to use in the operation of the game. Also included are a coin head 36 to allow the player to insert coins to activate the slot machine 20, a payout tray 38 at which the player receives any winnings and a coin return 39 for rejected or invalid coins.

A television monitor 40, such as Magnavox RD0945-C1-9, and an audio speaker/microphone 42, such as an Atlas-Soundolier Model No. FC54-T72, are mounted adjacent to the slot machine 20 in a convenient location near the player, preferably in a housing (such as housing 24 or 26) at the top of the slot machine 20 just above the game display screen 32. The monitor and microphone must be in close proximity to the player, i.e., sufficiently close to the player to permit easy viewing of the monitor and to enable clear pickup by the microphone of the player's conversation to the control center operator. The speaker/microphone 42 is used for communications between the control station operator and the player as well as for sound from programs broadcast over the monitor. Each slot machine preferably has its own dedicated speaker means and microphone means mounted in close proximity to the machine such that the microphone does not pick up much background noise or conversations at adjacent machines, and that audio emanating from the speaker is reasonably directed to only one machine and not adjacent machines. The location and distance of the speaker and microphone are easily determined by one skilled in the art.

The television monitors should be mounted adjacent to the slot machines. By "adjacent to" it is meant that the monitors may be mounted directly on the slot machines (e.g., within the slot machine housing) or may be located immediately above or to the side of the machines such that the monitor is easily viewed by a slot player while he is playing the machine. Each monitor is preferably within 6 feet, more preferably within 3 feet, of the machine. Preferably, each slot machine has a separate television monitor, although two or more slot machines could share a television monitor mounted, for example, immediately between the machines. In the preferred embodiment, each slot machine has its own television monitor mounted immediately above the machine, as shown in FIG. 2. This enables the player to keep an eye on the monitor while playing the machine without having to move his head. Since the monitor is substantially within the player's field of view while he is playing the machine, any announcements or important events on the monitor are brought to his attention immediately. The monitor 40 and audio speaker/microphone 42 are mounted behind a panel 44 in the front of the housing. In another preferred embodiment, the monitor, speaker, and microphone are housed directly in the slot machine cabinet.

Figure 3:
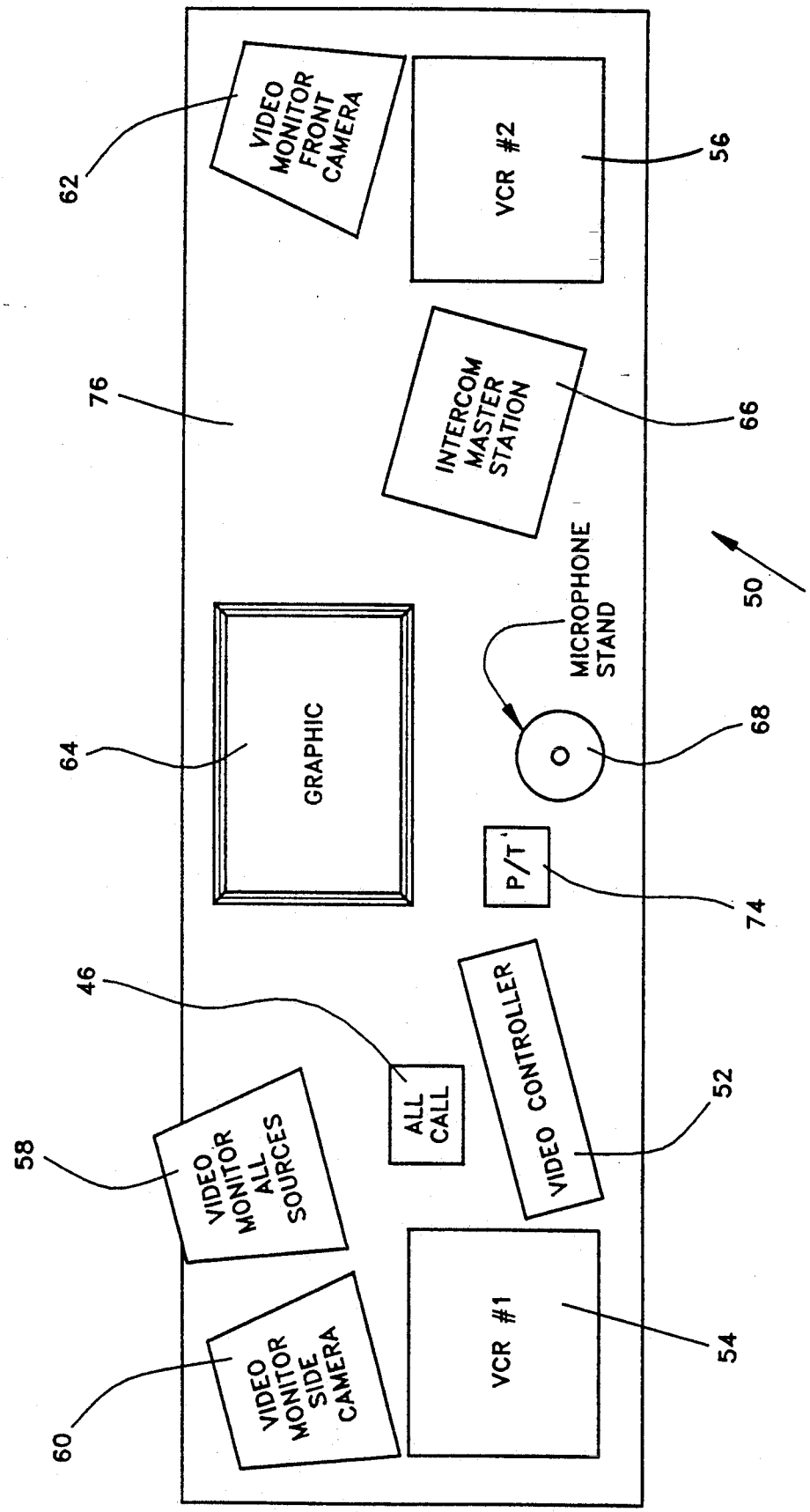
FIG. 3 shows a layout of the control station forming a part of the slot machine parlor.

The entire audio/video communications system can be operated by one person at the control station 50, shown in FIG. 3. The control station includes all equipment which the operator needs to communicate with the slot players and to direct and view the signals being transmitted. A summary of the items located at the control station and their functions is as follows:

1. Video controller 52, which is a keyboard for selecting desired video signals and for sending each such signal to the desired slot monitors. In a preferred embodiment, the video controller also includes the pan, tilt, and zoom controls for live video cameras.

2. Intercom master station 66, which provides the same functions as video controller 52 for audio signals, and also contains a control station speaker and microphone for communication with the players.

3. VCRs #1 and #2, 54 and 56, which are a source for taped video programming.

4. Video monitors 60 and 62 which display the picture from front and side live cameras generally aimed at the control station.

5. Video monitor 58 which monitors any selected video signal source.

6. Pan/tilt switches 74 which control the video cameras. In a preferred embodiment, these switches are included on the controller 52.

7. An override switch or "All-Call" panel 46 which contains 10 switch buttons, each of which relate to a specific video source. Depressing one of the switches transmit the signal from the selected source to all slot monitors and to the "all sources" monitor 58.

8. A graphic diagram or guide 64 which provides a layout of the slot parlor, similar to FIG. 1. The diagram serves as a map or key of the slot parlor, enabling the operator to identify any station in the parlor by a number shown on the graphic which corresponds to numbers on the video controller and intercom master station.

9. A microphone 68, which may optionally be a speaker/microphone, for audio communications with slot players.

The video controller 52 is a keyboard that functions to control all video input to the control station and output from the control station. The video controller is operatively connected to first and second video cassette recorders 54 and 56 for transmitting prerecorded video material to each of the television monitors 40 on the slot machines 20. By means of the video controller, an operator can select input from the VCR's, commercial television signals, live cameras, PC's, video disks, or any other video source to provide to the video monitors at the slot machines.

The control station 50 also includes a front-area video monitor 60 and a side-area video monitor 62 which display respectively the signals provided from the first video camera 70 and the second video camera 72. The first video camera 70 takes live video pictures of the control station 50 from the front of the control station; these pictures are displayed in real time on the front-area video monitor 62. The second video camera 72 takes live video pictures of the control station 50 from the side of the control station and the display of those pictures is shown to the operator of the control station on the side-area video monitor 60.

An operator (not shown) may sit or stand at the control station and, through operation of the video controller 52 and the master intercom station 66, direct transmissions from the menu of video and audio sources selectively to the slot players.

The graphic drawing 64 is mounted on a flat table surface 76 at control station 50. The graphic depicts the layout of the slot parlor, as shown in FIG. 1. Each slot machine or station is designated by a number. For example, on FIG. 1 the slot stations at grouping 92 are numbered 1-8 with stations 1, 2, 3, and 4 being located in a row opposite stations 5, 6, 7, and 8. The two rows of machines are separated by housing 24 which encloses the video monitors and speaker/microphones. A nearby row of machines is designated 9, 10, 11, 12, and 13. On the graphic display, this grouping 9-13 is designated by a group number 115 (as shown by the broken line on FIG. 1), enabling this group to be identified and accessed easily by the operator by inserting only the number 115 into the keyboard. Should the operator wish to send a specific transmission (e.g., a live announcement of a contest limited to those specific machines) to group 115 or group 92, the operator could enter these identification numbers in the keyboard 52 and push the "enter" button, and the transmission would immediately appear on all monitors in the group. The same information can be programmed into audio keyboard 66. Also included on the graphics are identification numbers for each audio and video source which can be entered by the operator into the system via the keyboard or all-call panel in order to send out a signal from said source.

Figure 4:
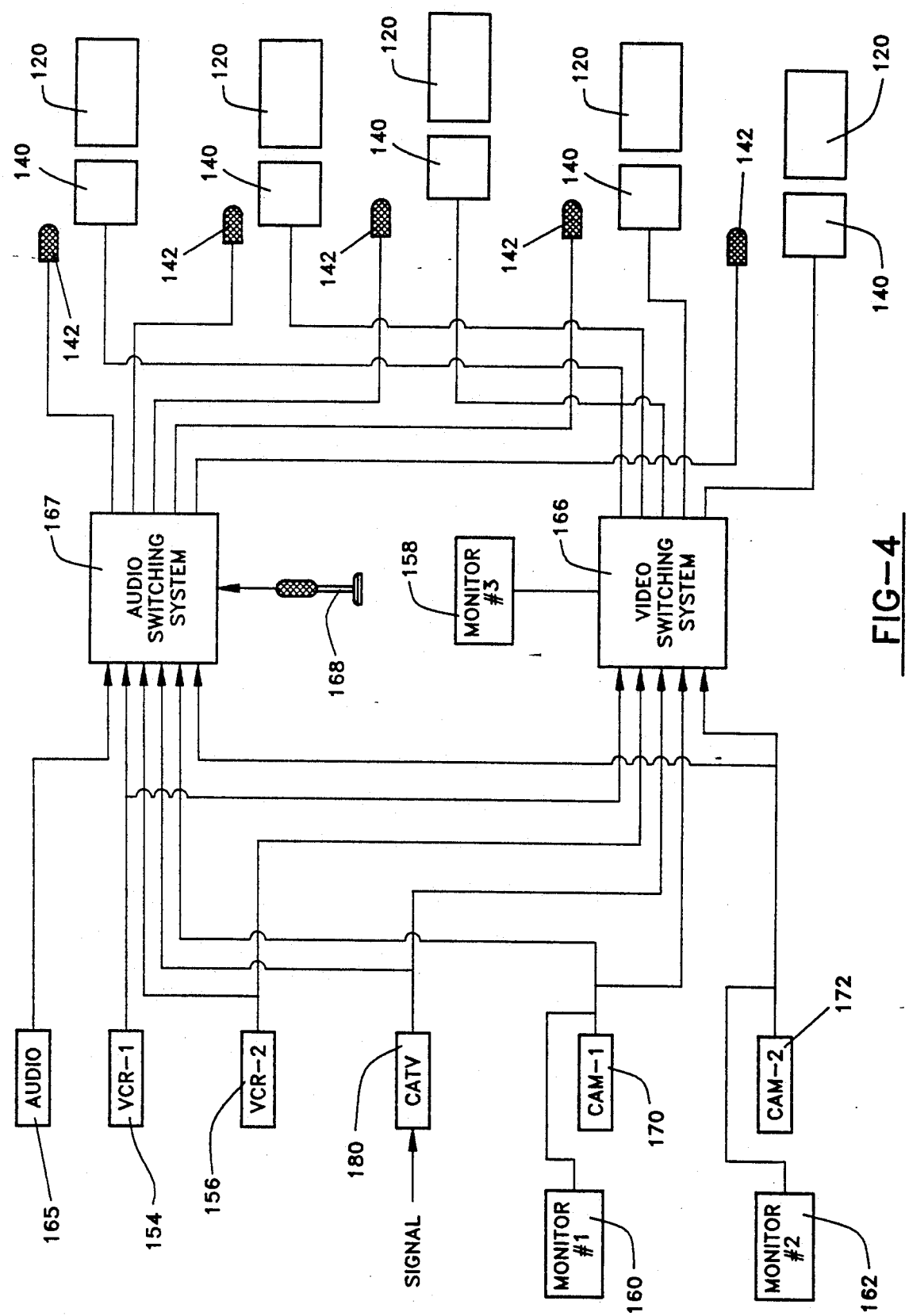
FIG. 4 is a block diagram of the audio and video systems of the invention.

FIG. 4 shows in block diagram format the various components that constitute the present invention. The system components shown in FIG. 4 are the same components shown in the prior drawings, though the indicator numbers are each increased by 100. Both the audio switching system 167 and the video switching system 166 are commercially available computerized systems designed for the purpose of handling multiple sources and multiple destinations. Video switching system 166 is American Dynamics AD2050 Mega Power II Matrix Switcher/Control System. For the configuration shown in the drawings, Model AD2050 R4-7 was used. Audio switching system 167 is a Dukane MACS II system.

Each switching system has a plurality of sources selectively available to provide various input. For example, first and second video cassette recorders 154 and 156 each provide video and audio signals to the respective switching systems. A conventional audio source 165 such as an audio tape deck, audio cassette player, compact disk player or laser disk player, is also connected to the audio switching system. Live audio transmissions from the operator to the slot machines 120 can also be effected by means of the microphone 168 (Telex TD-14) located at the control station or by means of a hand-held telephone included on the intercom master station 166.

Live video signals can be transmitted to each of the slot machine monitors 140 at slot machines 120 by means of the first video camera 170 and second video camera 172. Any commercial video cameras, such as Sanyo VDC-4124 color cameras, may be used. These cameras are positioned in fixed locations in the slot parlor, and are preferably directed at the front and side of the control station to enable transmissions of live announcements or events at the station. Pictures being taken by these cameras 170 and 172 are displayed to the operator by means of a side-area video monitor 160 and a front-area video monitor 162, respectively. The operator can operate each camera by means of a conventional pan/tilt switch 274 (FIG. 5, or 74, FIG. 3) which controls the orientation and zoom of the cameras. In the preferred embodiment of the present invention, both the first video camera 170 and second video camera 172 are mounted in a ceiling area above the slot parlor, and may be retractively mounted if so desired.

A conventional television programming source such as cable television box 180 enables any television program, e.g, sporting events or movies, to be transmitted to players seated at the slot machines 120 in the slot parlor. As an alternative to cable television feeds, over-the-air transmissions can be utilized. Each slot machine 120 is provided with an associated television monitor 140 and audio speaker/microphone 142 to receive the video and audio signals.

Figure 5:
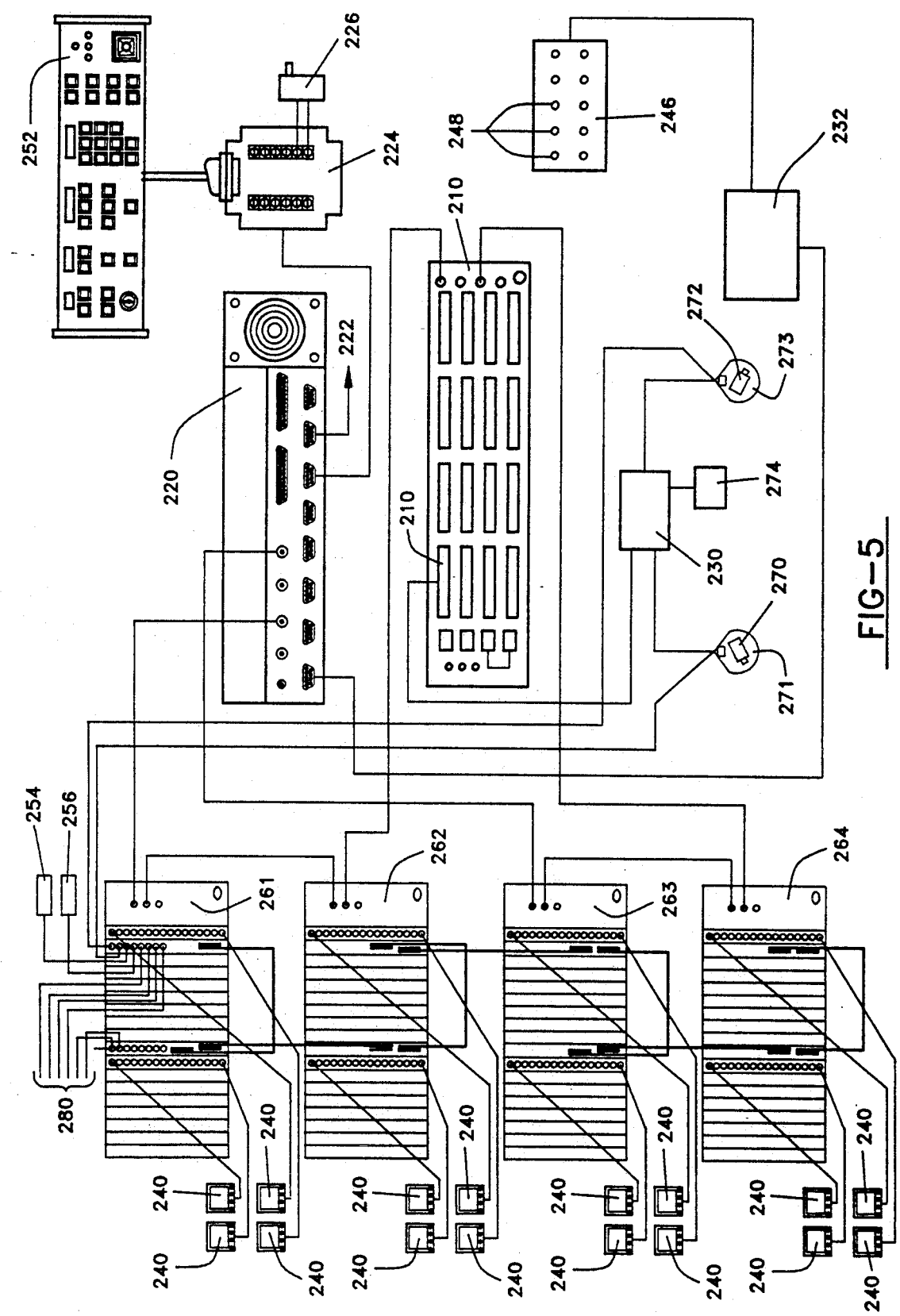
FIG. 5 shows a block circuit diagram of the video switching system.

FIG. 5 depicts a more detailed block circuit diagram of the video switching system of the present invention. The video switching system of the present invention includes the electrical components necessary to interconnect the audio and video devices at each of the slot machines to the various video and audio sources that constitute the elements of the present invention. At the center of the video switching system is a code generator/distributor 210 and a central processing unit 220. The central processing unit 220, for example American Dynamics Model No. AD1995C/R, controls the operation of a plurality of main frames 261, 262, 263 and 264, each of which is American Dynamics Model No. AD2020R. The main frames function as video matrix outputs and in turn operate a plurality of television monitors 240, each one of which is associated with a particular slot machine as described above. In a preferred embodiment, 9" color television monitors made by Magnavox, Model No. RD0945-C1-9 are used.

The central processing unit 220 is connected through a connection box 224 to a keyboard 252, American Dynamics Model No. AD1678C/M, through which the operator of the system can select various video signals to be sent to the television monitors that are associated with each slot machine. A power supply 226 is connected to the connection box 224 to provide power to the keyboard. If desired, the central processing unit 220 can also be connected to a personal computer 222 by which the system can be programmed for different group call setups.

The control code generator/distributor unit 210, American Dynamics Model No.2091R, is connected to the two video cameras 270 and 272 which are driven by the pan/tilt driver unit 230. Receiving control signals, either in Manchester Code and/or RS-232 output, generated by the keyboard/CPU, the control code generator/distributor unit 210 in turn processes those signals for distribution to the pan/tilt housing 271 Video distribution is made via the mainframe units 261-264 and is controlled either by use of the central processing unit 220 and the keyboard 252 or by use of the all-call box unit 246.

In a preferred embodiment, the main frames 261, 262, 263 and 264 are connected in series. The first video cassette recorder 254 and the second video cassette recorder 256, each preferably being JVC Model No. HRD740 video cassette recorders, provide video signals to the main frame 261. Similarly, cable television input lines 280 are also connected to the main frame 261.

The central processing unit 220 also controls the operation of the video cameras. A pan/tilt driver 230, suitably dual channel driver American Dynamics Model No. AD1684B, is connected to central processing unit 220 and in turn is connected to first video camera 270. In the preferred embodiment, the pan/tilt driver 230 controls the panning and tilting functions of the video cameras so that the video cameras can be turned to shoot any location in the slot parlor within the camera's field of vision. The first video camera 270 is mounted within a first dome 271, such as Bayport Model No. P2412LS, preferably located in the ceiling above the slot parlor so that the first video camera 270 is unobtrusive to the players. The second video camera 272 is likewise mounted within a second dome 273. Each camera can be provided with a zoom lens, such as Vicon Model No. V12.5-75M4, to allow wide shots or closeups at the option of the operator. The zoom lens can be operated by a remote switch located at the control station, preferably on the keyboard.

The central processing unit 220 is also connected through an alarm interface unit 232, American Dynamics Model No. AD1696, to the all-call panel 250. The alarm interface unit 232 receives a signal from the all-call panel indicating the video signal to be received by all television monitors units 240. Ten buttons or switches 252 are used to select the various video sources of input; upon actuation of the buttons the alarm interface unit transmits said input to the central processing unit 220. The central processing unit 220 then transmits the requisite command code to the mainframes 261, 262, 263 and 264, whereby all television monitors units 240 then receive the video signal selected by the all-call panel.

The audio switching system used in the invention is entirely independent from the video switching system (although the two systems could be electronically integrated if desired). The audio switching system 167 is shown in block diagram in FIG. 6 and is completely conventional. The function of the system is to direct audio transmissions from any audio source (including microphone 168, audio deck 165, VCR's 154 and 156, and TV source 180) selectively to any slot machine microphone 142 or any group of microphones 142.

The audio switching system includes intercom master station or keyboard 166 which is Dukane Model 7A1100C Administrative Control Station. The intercom system 169 is the Dukane Modular Administrative Communication System (MACS II). The Dukane MACS II system is a modular system which may have different Dukane components depending on the number of input sources, the number of speakers, and the demand for accessing different combinations of speakers. All components are provided by Dukane Corporation of St. Charles, Ill. For the audio system described herein for approximately 100 stations, Dukane Model 12A2080 was used as central equipment. Auxiliary amplifiers 174 shown schematically on FIG. 6 are Dukane 1A3125 and TOA-A512A. These amplifiers were used as standard options to provide amplification for the all-call features. Audio inputs were directed to the system through the TOA-A512A amplifier. The amplifiers are conventional options in the MACS II system and are connected as specified by Dukane.

Connection of the switching systems is completely conventional, with the systems being programmed for the various components used in accordance with instructions provided by the manufacturer.

In use, the operator from the control station can provide multiple video and audio signals to the players using the slot machines. The same video and audio signal can be sent to each television monitor 40 and audio speaker/microphone 42 so that all players can be provided with entertainment in the form of movies or sporting events or even daytime soap operas from the cable television or over-the-air television inputs. Alternatively, by using the video cassette recorders integrated in the system, the operator can send preprogrammed information to the players in the form of advertising and promotion of services and facilities available at the gaming establishment or even promote the goods and services of outside advertisers.

Audio transmissions alone are also possible through the use of the tape deck 165 or microphone 168 so that the operator can provide background music, news and weather information, or announcements of contests or jackpots to the players.

Live video and audio programming can also be provided to the players. The two video cameras 70 and 72 allow the operator the ability to shoot live television pictures of events occurring in the slot parlor or other locations in the gaming establishment within the field of view of the video cameras. For example, the reaction of a player winning a large jackpot and being paid by the personnel of the gaming establishment can be transmitted live to all of the other players in the slot parlor. By the use of the microphone 68, the operator can make live personalized announcements of promotions or other activities to the players, and can converse with any individual player.

Operation of the system is accomplished simply through use of the video and audio switching keyboards. Any video source can be connected to all slot monitors by pushing the appropriate button on the all-call panel. The audio for the transmission is similarly sent through the built-in all-call feature in the intercom station 66. Transmissions to individual slot monitors or groups of monitors are sent by entering the site code from the graphic 64. The operator can converse with a player at any station by operating the master intercom station to find out what the player wishes to see on the monitor or to provide friendly encouragement to the player. Specifically, in accordance with the instructions provided by the manufacturer, the operator selects an audio or video source by number from the graphic and enters into the keyboard, then selects by identification numbers the slot monitors desired to receive the transmission, and enters these into the keyboard. The switching system then completes the desired connections.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. An entertainment system for players of slot machines comprising
    a control station located remote from the slot machines for selectively transmitting video signals from a plurality of video sources to video monitors located adjacent to slot machines,
    a plurality of slot machines adapted to be manually activated by players located at the machines,
    a plurality of video monitors mounted adjacent to the slot machines such that a slot player can view a video monitor while playing the slot machine,
    a plurality of video signal sources located at the control station, said video signal sources including a plurality of commercial television broadcast sources and at least one live video camera, video circuit means for connecting the video signal sources to the video monitors, and video switching means located at the control station for simultaneously selectively connecting each of said video monitors to any of a plurality of different video signal sources.

2. The entertainment system of claim 1 wherein each slot machine has a video monitor mounted immediately above the machine within six feet of the machine.

3. The entertainment system of claim 1 wherein a video monitor is mounted immediately above each slot machine within three feet of said slot machine.

4. The entertainment system of claim 1 wherein the video signal sources are selected from the group consisting of recorded video playback means, a commercial television broadcast source, a cable television source, and at least one live video camera.

5. The entertainment system of claim 1 wherein the video switching means includes a keyboard whereby an operator can select a signal from any video signal source and can select any video monitor or group of video monitors for connection to said signal source.

6. The entertainment system of claim 1 wherein each slot machine is selected from the group consisting of reel slot machines, video reel slot machines, video poker machines, video "21" machines, video bingo machines, video keno machines, video roulette machines, video lottery machines, and video punch card machines.

7. The entertainment system of claim 1 also comprising at least one video camera positioned to photograph the control station, and camera control means located at the control station for remotely operating said video camera.

8. The entertainment system of claim 7 also comprising a second video camera directed to photograph said control station, and second camera control means located at the control station for remotely controlling said second video camera.

9. The entertainment system of claim 1 wherein the plurality of slot machines comprises at least ten machines.

10. The entertainment system of claim 1 wherein the plurality of slot machines comprises at least forty machines.

11. The entertainment system of claim 1 wherein the plurality of slot machines comprises from fifty to one hundred fifty machines.

12. The entertainment system of claim 1 also comprising a graphic guide mounted at the control station depicting each slot machine and each video source, said graphic guide including identification means for each slot machine and each video source, and a keyboard for inputting identification means into the video switching means whereby an operator at the control station can identify each slot machine by its identification means and input the identification means into the keyboard to connect a desired video signal source with at least one selected video monitor.

13. A slot parlor comprising
a plurality of slot machines adapted to be manually activated by players located at the machines,
a control station located remote from the slot machines for selectively transmitting video signals from a plurality of video sources to video monitors located adjacent to slot machines,
a plurality of video monitors mounted adjacent to the slot machines such that a slot player can view a video monitor while playing the slot machine,
a plurality of video signal sources located at the control station, video circuit means for connecting the video signal sources to the video monitors, and video switching means located at the control station for selectively simultaneously connecting each of said video monitors in the slot parlor to any of a plurality of different video signal sources, a plurality of audio signal sources located at the control station, an audio speaker mounted adjacent each slot machine, and an audio switching system for selectively connecting each of said audio speakers to any of a plurality of different audio signal sources.

14. The slot machine parlor of claim 13 also comprising microphone means mounted in close proximity to each slot machine to enable a player of said machine to communicate with an operator at the control station, a control station speaker located at the control station, and circuit means connected through the audio switching means for electrically connecting the microphone means to the control station speaker.

15. The slot machine parlor of claim 13 wherein a video monitor is mounted immediately above each slot machine within three feet of said slot machine.

16. The slot machine parlor of claim 13 wherein the video signal sources are selected from the group consisting of recorded video playback means, a commercial television broadcast source, a cable television source, and at least one live video camera.

17. The slot machine parlor of claim 13 wherein the video switching means includes a keyboard whereby an operator can select a signal from any video signal source and can select any video monitor or group of video monitors for connection to said signal source.

18. The slot machine parlor of claim 13 also comprising at least one video camera positioned to photograph locations at the control station, and camera control means located at the control station for remotely operating said video camera.

19. The slot machine parlor of claim 13 also comprising a second video camera positioned to photograph said control station, and second camera control means located at the control station for remotely controlling said second video camera.

20. The slot machine parlor of claim 13 wherein the plurality of slot machines comprises at least forty machines.

21. The slot machine parlor of claim 13 wherein the plurality of slot machines comprises from fifty to one hundred fifty machines.

22. The slot machine parlor of claim 13 also comprising a graphic guide mounted at the control station depicting each slot machine and each video source, said graphic guide including identification means for each slot machine and each video source, and a keyboard for inputting identification means into the video switching means whereby an operator at the control station can identify each slot machine by its identification means and input the identification means into the keyboard to connect a desired video signal source with at least one selected video monitor.

23. An entertainment system for players of slot machines comprising
at least 40 slot machines adapted to be manually activated by players located at the machines,
a control station located remote from the slot machines for selectively transmitting video signals from a plurality of video sources to video monitors located adjacent to slot machines,
a plurality of video monitors mounted adjacent to the slot machines such that a slot player can view a video monitor while playing the slot machine,
a plurality of video signal sources located at the control station, video circuit means for connecting the video signal sources to the video monitors, and video switching means for selectively connecting each of said video monitors to any of a plurality of different video signal sources,
a plurality of audio signal sources located at the control station, an audio speaker mounted adjacent each slot machine, and an audio switching system for selectively connecting each of said audio speakers to any of a plurality of different audio signal sources,
microphone means mounted in close proximity to each slot machine to enable a player of said machine to communicate with an operator at the control station, a control station speaker located at the control station, and circuit means connected through the audio switching means for electrically connecting the microphone means to the control station speaker, at least one video camera positioned to photograph the control station, and camera control means located at the control station for remotely operating said video camera, and a graphic guide mounted at the control station depicting each slot machine and each video source, said graphic guide including identification means for each slot machine and each video source, and a keyboard for inputting identification means into the video switching means whereby an operator at the control station can identify each slot machine by its identification means and input the identification means into the keyboard to connect a desired video signal source with at least one selected video monitor.

* * * * *